United States Patent [19]

Ernst

[11] 4,244,457
[45] Jan. 13, 1981

[54] PLATE CONVEYOR, ESPECIALLY FOR TRANSPORTING INDIVIDUALS

[75] Inventor: Werner Ernst, Rotkreuz, Switzerland

[73] Assignee: Inventio AG, Hergiswil, Switzerland

[21] Appl. No.: 904,495

[22] Filed: May 10, 1978

[30] Foreign Application Priority Data

May 25, 1977 [CH] Switzerland .................. 6438/77

[51] Int. Cl.³ .................. B65G 15/00; B65G 17/06
[52] U.S. Cl. .................. 198/321; 198/851
[58] Field of Search .............. 198/850, 851, 849, 793, 198/321

[56] References Cited

U.S. PATENT DOCUMENTS

| | | | |
|---|---|---|---|
| 440,931 | 11/1890 | Swenson | 198/851 |
| 1,737,823 | 12/1929 | Bodle | 198/851 |
| 2,059,063 | 10/1936 | Tourville | 198/851 |
| 2,098,971 | 11/1937 | Perkins | 198/851 |
| 2,593,324 | 4/1952 | Mann | 198/851 |
| 2,921,669 | 1/1960 | Bainbridge | 198/822 |
| 3,530,799 | 9/1970 | Braun | 198/321 |
| 4,049,500 | 9/1977 | Kamm | 198/793 |

*Primary Examiner*—Robert B. Reeves
*Assistant Examiner*—Brian Bond
*Attorney, Agent, or Firm*—Werner W. Kleeman

[57] ABSTRACT

A plate conveyor or moving walk, especially for transporting individuals, comprising plates or pallets arranged in succession in the direction of travel of the moving walk. These plates are connected with two essentially mutually parallely extending, endless drive chains. Traveling rolls enable the plate conveyor to revolve upon guide rails in one or a number of horizontal and/or inclined planes or portions. The drive chains are arranged along sides of the plates extending parallel to the direction of travel of the plate conveyor. Each chain link is connected by at least one attachment element with one of the plates.

10 Claims, 8 Drawing Figures

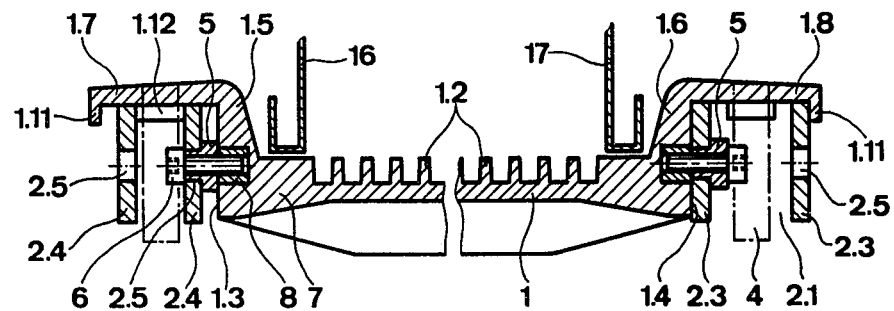
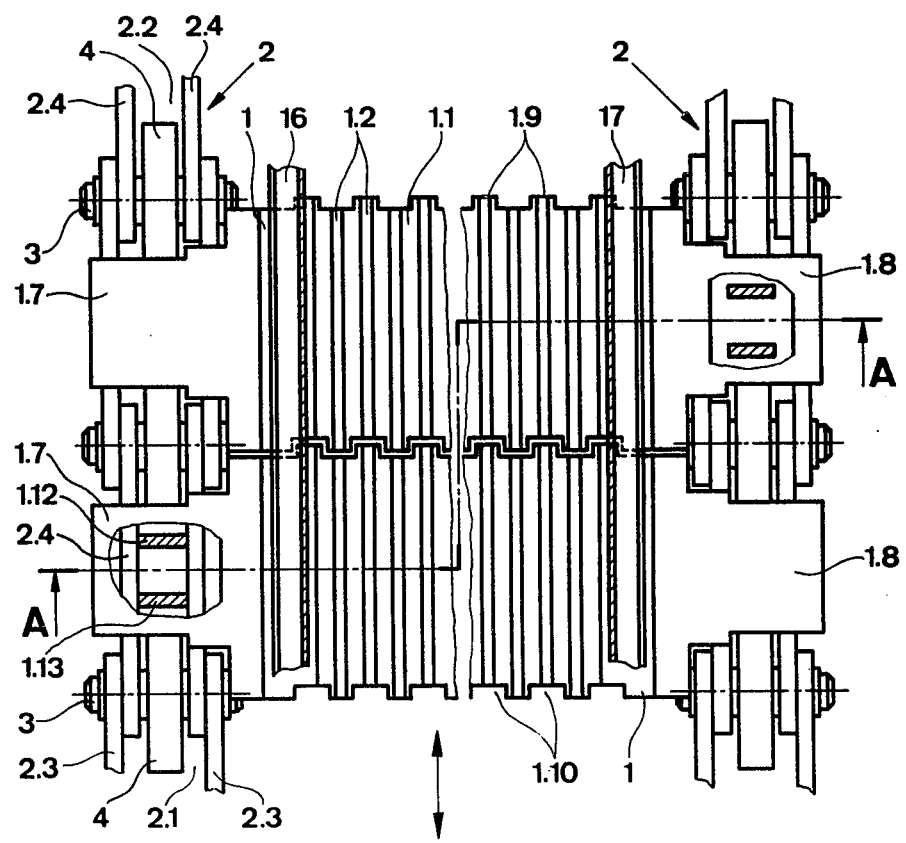

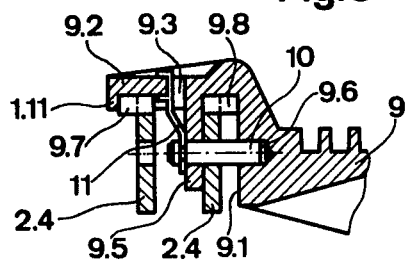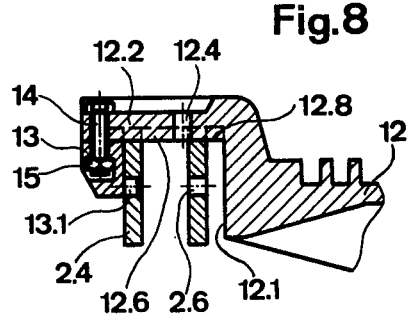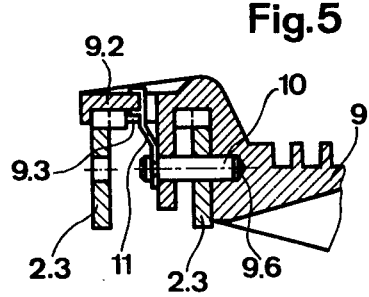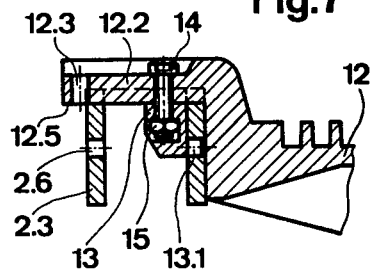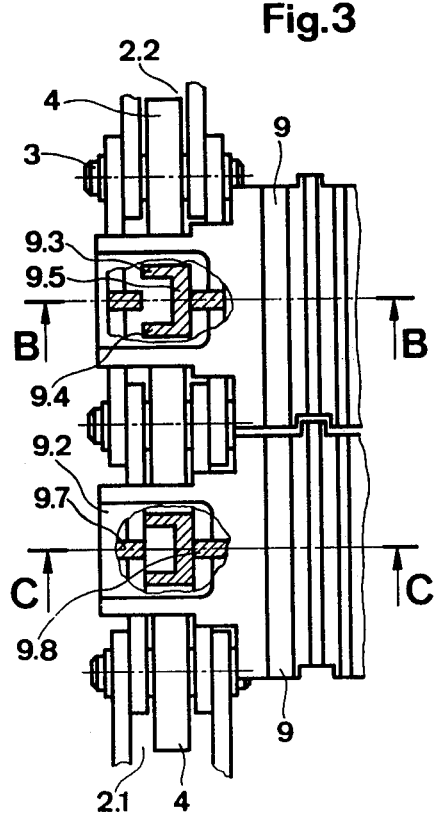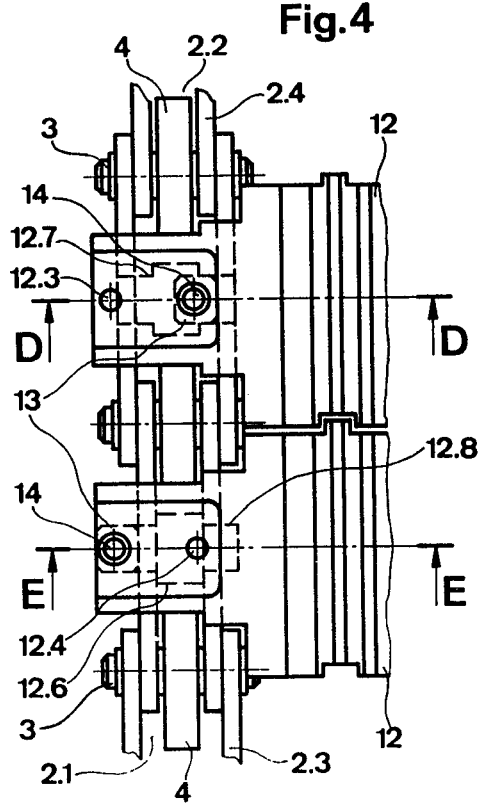

PLATE CONVEYOR, ESPECIALLY FOR TRANSPORTING INDIVIDUALS

BACKGROUND OF THE INVENTION

The present invention relates to a new and improved construction of plate conveyor or moving walk, especially although not exclusively for transporting individuals, which is of the type comprising a series of plates or pallets arranged in tandem or succession in the direction of travel of the moving walk, the plates being connected with two mutually parallely extending, endless drive chains, there further being provided traveling rolls or rollers by means of which the moving walk can revolve at guide rails in one or a number of horizontal and/or inclined planes or portions. Since the plate conveyor or moving walk can be also used to convey loads, this term is obviously used in its broadest sense.

With such type prior art plate conveyors or moving walks the length of each plate, measured in the direction of travel of the conveyor belt, is a multiple of the division of the endless drive chain. The plates normally are arranged over the chains and are pivotably supported at one of their ends by prolonged pivot shafts or axles of the chain links. Traveling rolls are mounted at the prolonged pivot shafts, by means of which the conveyor belt revolves at guide rails. At their other end the plates are equipped with slots by means of which they are slidingly supported upon pivot shafts of the respective neighboring plate or at other prolonged or elongated pivot shafts of the chain links which likewise are equipped with traveling rolls. For safety reasons, and also to compensate the air gap or space needed at the connection locations of the plates, especially at the curved sections or portions of the path of travel, the ends of the plates are structured in a comb-like fashion, the tines or teeth of the comb of one plate engaging into the teeth gaps of the other plate.

These state-of-the-art plate conveyor belts or bands possess the advantage that they only need a reduced number of plates due to the relatively large plate length. Conversely, however, they have the drawback that they are unsuitable for paths of travel incorporating an inclined portion and horizontal access or entry portions, as such, for instance, is the case at installations which connect two superimposed landings or floors of a building. In order to prevent the formation of undesired kink or buckled locations at the connection locations of the plates, upon transition from a horizontal plane to an inclined plane at the load-carrying surfaces of the conveyor belt, it is imperative that such transition be accomplished at curves having a large radius. These kink or buckle locations must be avoided inasmuch as they endanger the safety of the user of the plate conveyor belt or moving-walk belt and also impair the user's comfort. When working with extremely long plates the radius of curvature can amount to as much as 20 meters. Therefore, it should be apparent that for a given useful path of travel of the conveyor belt the access parts of the total length of the equipment themselves must be appreciably enlarged.

A further drawback of such plate conveyor belt resides in the fact that the sprocket wheels arranged at the deflection locations of the drive chains must possess a diameter which coincides at least with the length of a plate. This, in turn, requires a relatively large height of the truss or frame for the related parts of the equipment. In the event there are used plates of extremely large length, then it is oftentimes necessary to provide at each deflection location a special device which retains the plates in horizontal position. This construction appreciably increases the costs of the installation.

If the employed plates have a large length, then, due to manufacturing inaccuracies or irregular wear, especially at the drive chains, there are formed alignment deviations i.e., misalignments. Equally, a slight inclination of the shafts carrying the plates can cause at the other end of the plates appreciable lateral and/or vertical displacements. The play which is usually present between the traveling plates and the stationary bannisters or guard rails, and whose permissible lateral and vertical size must comply with strict regulations or requirements, thereby can be abnormally enlarged or reduced in size or, in fact, totally eliminated. Consequently, it is not only extremely difficult to arrange the stationary bannisters over the load-carrying surfaces of the plates, but furthermore, if the arrangement of the bannisters is accomplished laterally of the plates, it is usually necessary to additionally provide expensive devices for the lateral guiding of the plates.

It logically follows that the use of short plates would enable avoiding these different drawbacks. In particular, there would then be possible an appreciable reduction in the size of the radius of curvature during the transition from a horizontal plane into an inclined plane. For a given length of the plates this reduction of the radius causes an appreciable enlargement of the sector angle. In the known installations, wherein the load-carrying surface of the plates is spaced at a relatively great distance from the hinge or pivot shafts of the drive chains, there would be produced an appreciable enlargement of the air gap or space between the plates with convex curves or a reduction or, in fact, a disappearance of such air gap in the case of concave curves. These differences in the width of the air gaps could be partially compensated by prolonging the comb teeth or teeth gaps, respectively, located at the plate ends. On the one hand, there would be increased the danger of rupture, and, on the other hand, at the location of the convex curves articles or even the fingers of the users, particularly children, could become caught in the intermediate spaces formed between the comb teeth and the gaps. It is because of this situation that the size of the requisite gap likewise has strict requirements imposed thereon.

Therefore, it would be advantageous to arrange the load-carrying surfaces of the plates in the same plane as, or in an approximately similar plane as the plane containing the hinge or pivot shafts of the drive chains. With the heretofore known plate conveyor bands this arrangement is practically impossible, since generally the shafts which pivotably support the plates also serve to mutually interconnect the drive chains.

SUMMARY OF THE INVENTION

Hence, with the foregoing in mind, it is a primary object of the present invention to provide a new and improved construction of plate conveyor or moving belt, especially but not exclusively, for transporting individuals, which is not associated with the aforementioned drawbacks and limitations of the prior art proposals.

Another and more specific object of the present invention aims at providing a new and improved construction of plate conveyor belt which does not exhibit the previously explained disadvantages, and wherein, by using and particularly specially arranging relatively small components, it is possible to appreciably reduce in size the air gap or space between the plates and to appreciably reduce in size the total length of the equipment.

Still a further significant object of the present invention aims at providing a new and improved construction of plate conveyor or moving belt which is relatively simple in design, economical to manufacture, extremely reliable in operation, safe to use, not readily subject to breakdown or malfunction, and requires a minimum of maintenance and servicing.

Now in order to implement these and still further objects of the invention, which will become more readily apparent as the description proceeds, the plate conveyor or plate conveyor belt of the present development is manifested by the features that the drive chains are arranged along the sides of the plate which extend essentially parallel to the direction of travel of the plate conveyor belt, and each chain link is connected by means of at least one attachment element with one of the plates.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a plan view illustrating part of a plate conveyor belt or moving-walk belt constructed according to the teachings of the present invention;

FIG. 2 is a cross-sectional view of the plate conveyor belt shown in FIG. 1, taken substantially along the line A—A thereof;

FIG. 3 is a fragmentary plan view of a further variant of the plate conveyor belt shown in FIGS. 1 and 2;

FIG. 4 is a fragmentary plan view of a still further variant of the plate conveyor belt illustrated in FIGS. 1 and 2;

FIG. 5 is a cross-sectional view taken substantially along the line B—B of FIG. 3;

FIG. 6 is a cross-sectional view taken substantially along the line C—C of FIG. 3;

FIG. 7 is a cross-sectional view taken along the line D—D of FIG. 4; and

FIG. 8 is a cross-sectional view taken along the line E—E of FIG. 4.

DETAILED DESCRIPTION OF THE PREFERRED EMBODIMENTS

Describing now the drawings, the plate conveyor or moving walk—hereinafter also referred to as a plate conveyor belt or moving-walk belt—partially illustrated in FIGS. 1 and 2 will be seen to comprise a series of tandemly or successively arranged plates or pallets 1 and, depending upon its design, such plate conveyor belt moves in one or the other of the directions of travel indicated by the double-headed arrow shown in FIG. 1. The plates or pallets 1 possess an approximately rectangular shape, preferably fabricated for instance from a light metal alloy according to conventional die casting procedures, by way of example. The load-carrying or transporting surface 1.1—whether for passengers or other loads—of the plates 1 is provided, in conventional manner, with upstanding ribs 1.2 extending lengthwise of the plates in the direction of travel. At each of their sides 1.3 and 1.4, extending essentially parallel to such travel direction, and externally of the load-carrying surface 1.1, each such plate or pallet 1 possesses a raised or upstanding portion 1.5 and 1.6, respectively, each having extending essentially at right angles thereto a prolongation or extension 1.7 and 1.8, respectively, directed outwardly of the related plate 1. These prolongations or extensions 1.7 and 1.8 constitute support means or support portions for each such plate 1. For safety reasons, and equally for the purpose of compensating the air gap or space required between the series of plates 1, the ends of the plates 1 have a comb-like construction. Thus, the comb tines or teeth 1.9 of for instance a leading plate 1 engage into the teeth gaps 1.10 of the next following or trailing plate 1 with lateral play.

Reference character 2 designates motive means, here in the form of for instance two endless drive chains of conventional design. They alternately possess wide chain links 2.1 formed of two brackets or side plates 2.3 and narrow chain links 2.2 formed of two brackets or side plates 2.4. The wide chain links 2.1 are connected by hinge or pivot shafts or axles 3 with the narrow chain links 2.2. The two chains 2 having the same number of chain links respectively extend along the opposite sides 1.3 and 1.4 of the plates or pallets 1. These sides 1.3 and 1.4 extend essentially parallel to the direction of travel of the plate conveyor belt or moving walk. Between both brackets or side plates 2.4 of each of a number of the narrow chain links 2.2 there is rotatably mounted a traveling roll or roller 4 or equivalent structure at the related hinge or pivot shaft 3 which defines a pivot axis. These traveling rolls 4 enable the chains 2 to travel upon suitable standard guide rails, merely generally schematically represented by reference character 50 in FIG. 2. Due to engagement of the traveling rolls 4 into the tooth gaps of conventional and therefore not further illustrated sprocket wheels or the like of appropriate drive devices it is possible to synchronously drive both of the chains 2 in a manner well known in this art.

The plate conveyor belt possesses the same number of plates or pallets 1 as each chain 2 has wide chain links 2.1 and narrow chain links 2.2. As best seen by referring to FIG. 1, where there have only been illustrated two neighboring plates 1, the plates 1 alternately bear by means of the extensions or prolongations 1.7 and 1.8 of their lateral raised portions 1.5 and 1.6, respectively, upon a wide chain link 2.1 and a narrow chain link 2.2. At the side confronting the chain link and parallel to the direction of travel of the plate conveyor belt, each such extension or prolongation 1.7 and 1.8 possesses at its respective end a projection 1.11 forming together with the sides 1.3 and 1.4, respectively, of the plates 1 a guide or guide means in which there is guided a wide chain link 2.1. At the center of the plate sides 1.3 and 1.4 confronting the chain link each prolongation 1.7 and 1.8 additionally has two projections 1.12 and 1.13, respectively, arranged transversely with respect to the direction of travel of the conveyor belt, these projections 1.12 and 1.13 serving to guide a narrow chain link 2.2.

As best seen by referring to FIG. 2, at the center of the brackets 2.3 and 2.4 of each chain link 2.1 and 2.2, respectively, there is provided a respective bore 2.5. In each such bore 2.5 there is inserted a spacer sleeve 5 having a shoulder 5.1 which impacts against the associated chain link. Guided through a bore 5.3 of each spacer sleeve 5 is a suitable attachment element, such as a fixing or attachment bolt or screw 6. This fixing screw or threaded bolt 6 is threaded into a bushing or sleeve 8 having a threaded hole 7 and fixedly seated in the plate 1. The height of the shoulder 5.1 of the spacer sleeve 5 corresponds to the thickness of the brackets 2.3 and 2.4 of the chain links 2.1 and 2.2, respectively, so that during simple reversal of the position of the spacer sleeve 5 such can be beneficially conveniently used both for connecting a wide chain link 2.1 as well as also a narrow chain link 2.2 with the sides 1.3 and 1.4, respectively, of the plate 1, while using the same attachment bolts or screws 6.

Since each chain link 2.1 and 2.2 has operatively associated therewith a plate 1 and each chain link 2.1 and 2.2 is connected with one side of the related plate 1, it is not only possible to use very short plates or pallets 1, but additionally, the load-carrying surface 1.1 of each of these plates 1 can be arranged in the plane defined by the pivot shafts of the drive chains 2. The radius of the curves, during transition from horizontal into inclined planes or portions, therefore can be appreciably reduced in size, resulting in a significant reduction in the total length of the installation, without there being formed a large space or air gap between the plates 1.

Now in FIGS. 3, 5 and 6 there is illustrated a variant construction of the plate conveyor belt or moving-walk belt, wherein the plates or pallets are here designated by reference character 9 and, as a matter of convenience in illustration, there have only been illustrated one of the prolongations or extensions 9.21 forming the support portions 9.2. The plates 9 are of approximately the same shape as the plates 1 of the previously described embodiment of FIGS. 1 and 2 and are here also arranged in the same manner as concerns both of the endless drive chains 2. In order to connect a wide chain link 2.1 and narrow chain link 2.2 with one of the confronting sides 9.1 of the related plate 9 the intermediate projections 9.3 and 9.4 of the support portion 9.2 have a downwardly directed prolongation or extension 9.5. This prolongation 9.5 and also the brackets or side plates 2.3 and 2.4, respectively, and the plates 9, have bores 9.6 located along a common axis. In each of these bores 9.6 there is arranged a threaded bolt 10 or other suitable attachment of fixing means. An elastic lamella, disk or shim or the like 11 or other suitable securing means, which engages in a ring-shaped groove, generally indicated by reference character 10.1, serves to secure each related bolt 10, and such disks or shims 11, in turn, are essentially form-lockingly or positively connected with the related support portion 9.2. In order to prevent any possibility of lengthwise displacement of the plates 9, the support portion 9.2 is provided with ribs 9.7 and 9.8 extending transversely with regard to the direction of travel of the plate conveyor belt. These ribs 9.7 and 9.8 engage into appropriate recesses 2.31 and 2.41 of the brackets 2.3 and 2.4 of the chain links 2.1 and 2.2, respectively.

Now in the variant embodiment shown in FIGS. 4, 7 and 8, each chain link 2.1 and 2.2 is connected with the sides 12.1 of a plate 12 by means of an anchoring or attachment element 13 or equivalent structure. Each such anchoring element 13 has a pin or plug 13.1 which can engage into a bore 2.6 of the brackets 2.3 and 2.4 of the chain links 2.1 and 2.2, respectively. Each anchoring element 13 is fixedly clamped at the support portion 12.2 of the related plate 12 by means of a thread bolt or screw 14 and a nut 15 or equivalent securing means. The screw 14 is guided in an inner guide bore 12.4 during the attachment of a wide chain link 2.1 and is guided in an outer guide bore 12.3 during the attachment of a narrow chain link 2.2. Now, as for the previously discussed embodiment, to avoid any possibility of lengthwise displacement of the plates 12, the side of the support portion 12.2 confronting the chain link possesses, apart from the guide projections 12.5 and 12.6 of a wide chain link 2.1 and a narrow chain link 2.2, respectively, also ribs 12.7 and 12.8 which engage with appropriately configured recesses 2.32 and 2.42 of the brackets 2.3 and 2.4, respectively.

Since these different arrangements enable the use of relatively short plates 1, 9, 12, the fixed bannisters or guard rails or the plate conveyor or moving belt of which there have only been shown in FIG. 1, to simplify the illustration, the socket or pedestal sheet metal plates 16, 17, can be arranged without any difficulty and with minimum play over the load-carrying surfaces of the plates 1, 9 and 12, as the case may be.

It is also to be understood that it is within the concepts of the invention to provide other arrangements of traveling rolls or rollers 4. Hence, for instance, such could be rotatably mounted upon extensions of the pivot shafts 3 which protrude towards the outside of the chain links 2.1 and 2.2. Instead of each pivot shaft 3 having operatively associated therewith a respective traveling roll 4, such also could be arranged at a spacing corresponding to a multiple of the chain link division. Additionally, it would be possible not to arrange the traveling rolls 4 at the pivot shafts 3, rather to rotatably mount such, for instance, at other shafts secured at the brackets 2.3 and 2.4 of the chain links 2.1 and 2.2 or at prolongations of the attachment elements 6 and 10 which interconnect the chain links 2.1 and 2.2 with the plates 1 and 9, respectively.

A further possibility of preventing lengthwise shifting or displacement of the plates or pallets 1, 9 and 12, is to equip each such plate at least at one side 9.1 and 12.1, respectively, with a tab or tongue, instead of with the ribs 9.7, 9.8, 12.7, 12.8, at the support portions 9.2 and 12.2 respectively. These tongues or tabs each then would have a recess which can be brought into engagement with the prolongation or extension of a pivot shaft 3 of a chain link 2.1 and 2.2.

While there are shown and described present preferred embodiments of the invention, it is to be distinctly understood that the invention is not limited thereto, but may be otherwise variously embodied and practiced within the scope of the following claims. Accordingly,

What I claim is:

1. A plate conveyor belt, especially for transporting individuals, comprising:

a plurality of plates arranged in succession in a predetermined direction of travel of the plate conveyor belt;

a pair of endless, substantially mutually parallel drive chains for driving said plates;

said plates being arranged between said drive chains;

each of said drive chains having chain links;

guide means for guiding said plates;

travelling rolls for revolvingly guiding said plates at said guide means in at least one or a number of predetermined planes;

each of said plates having opposed sides extending substantially parallel to the direction of travel of the plate conveyor belt;

each drive chain being arranged laterally of and along one of the parallel sides of the respective plates;

at least one attachment element for connecting each chain link with an associated one of the plates;

each plate having a prolongation at each said side extending essentially parallel to the direction of travel of the plate conveyor belt;

each said prolongation extending over its related chain link;

each said prolongation providing a support portion by means of which the related plate bears at said chain link;

each support portion having a side confronting the related chain link;

at least one projection provided at an end of said side of each support portion confronting said related chain link;

said at least one projection together with the side of the plate forming a guide;

the chain links of each drive chain comprising wider chain links and narrower chain links, each having pairs of brackets;

said wider chain links being received in said guide;

each support portion being further provided with at least one further projection approximately at the central region of a further side thereof confronting the chain link and which further projection extends transversely with respect to the direction of travel of the plate conveyor belt; and said further projection constituting a guide for an inner surface of the brackets of a narrow chain link.

2. The plate conveyor belt as defined in claim 1, wherein:

each plate has at each side means defining a threaded hole;

said at least one attachment element comprises at least one threaded attachment screw means for connecting each chain link with its related plate;

one bracket of each pair of the wider and narrower chain links confronting its related plate and having a bore;

a spacer sleeve inserted in said bore and receiving said attachment screw means and threaded into said threaded hole of said plate.

3. The plate conveyor belt as defined in claim 2, wherein:

said means defining said threaded hole is formed in said plate.

4. The plate conveyor belt as defined in claim 2, wherein:

said means defining said threaded hole comprises a sleeve member provided in said plate.

5. The plate conveyor belt as defined in claim 2, wherein:

said spacer sleeve has a shoulder having a height substantially equal to the thickness of said one bracket of said chain link and reversably insertable into the bore of such bracket, so that it is thus possible to connect a wide chain line and equally a narrow chain link with the related plate.

6. The plate conveyor belt as defined in claim 1, wherein:

said attachment element comprises a bolt for connecting each chain link with the side of the related plate;

said projections of each plate having extended portions directed downwardly;

each plate having a bore;

said bolt being guided in said downwardly directed extended portion and in said bracket of the chain link confronting the plate and in said bore located in said plate; and elastic securing means for securing said bolt.

7. The plate conveyor belt as defined in claim 6, wherein:

each said bolt has an annular groove;

said elastic securing means comprising a disk engaging in said annular groove of the bolt and form-lockingly connected with said support portion.

8. The plate conveyor belt as defined in claim 1, wherein:

each attachment element comprises an anchoring element for connecting each chain link with its related plate;

said one bracket of each chain link having a bore;

said anchoring element having a pin engagable in said bore of said one bracket of the chain link;

screw and nut means for fixedly clamping the anchoring element at the support portion of the plate;

said support portion having an outer and an inner guide bore for said screw in order to interconnect a wide chain link and a narrow chain link with said plate.

9. The plate conveyor belt as defined in claim 8, wherein:

said further confronting side having ribs extending transversely with regard to the direction of travel of the plate conveyor belt;

said brackets having recesses;

said ribs engaging with said recesses of said brackets of the chain links.

10. The plate conveyor belt as defined in claim 8, further including:

tab means provided at least at one side of each plate;

each chain link having a pivot shaft provided with an extended portion;

said tab means having a recess which can be brought into engagement with said extended portion of the pivot shaft of the chain link.

* * * * *